US009297887B2

(12) United States Patent
Yasugi et al.

(10) Patent No.: US 9,297,887 B2
(45) Date of Patent: Mar. 29, 2016

(54) DEVICE FOR DETECTING INTRUDING OBJECTS, AND METHOD FOR DETECTING INTRUDING OBJECTS

(71) Applicant: Panasonic Corporation, Osaka (JP)

(72) Inventors: Makoto Yasugi, Tokyo (JP); Hirofumi Nishimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 14/122,488

(22) PCT Filed: Feb. 14, 2013

(86) PCT No.: PCT/JP2013/000794
§ 371 (c)(1),
(2) Date: Nov. 26, 2013

(87) PCT Pub. No.: WO2013/128820
PCT Pub. Date: Sep. 6, 2013

(65) Prior Publication Data
US 2014/0159941 A1 Jun. 12, 2014

(30) Foreign Application Priority Data
Feb. 29, 2012 (JP) .................................. 2012-043043

(51) Int. Cl.
*G01S 13/04* (2006.01)
*G01S 13/06* (2006.01)
(Continued)

(52) U.S. Cl.
CPC .................. *G01S 7/41* (2013.01); *B61L 23/041* (2013.01); *B61L 29/30* (2013.01); *G01S 7/02* (2013.01);
(Continued)

(58) Field of Classification Search
CPC ....... B61L 23/04; B61L 23/041; B61L 29/24; B61L 29/28; B61L 29/30; G01S 7/02; G01S 7/03; G01S 7/28; G01S 7/285; G01S 7/295; G01S 7/41; G01S 13/02; G01S 13/04; G01S 13/06; G01S 13/42; G01S 13/88; G01S 13/93; G01S 13/931; G01S 3/02; G01S 3/04; G01S 3/14; G01S 3/46; G01S 3/465; G01S 5/02; G01S 5/10; G01S 7/021; G01S 7/36; G01S 7/38; G01S 7/42; G01S 13/08; G01S 13/10; G01S 13/26; G01S 13/28; G01S 13/282; G01S 13/284; G01S 13/286; G01S 13/426; G01S 13/44; G01S 13/4454; G01S 13/66; G01S 13/68; H04B 7/01
USPC ........... 342/27, 28, 59, 89–93, 175, 192–197, 342/94–97, 118, 145–147, 156, 13–20, 350, 342/368, 375, 378, 379
See application file for complete search history.

(56) References Cited

U.S. PATENT DOCUMENTS 3,175,213 A * 3/1965 Varela ...................... G01S 13/68
 342/131
3,510,871 A * 5/1970 Tamama ............. G01S 13/4454
 342/156

(Continued)

FOREIGN PATENT DOCUMENTS

| JP | 55151279 A | 11/1980 |
|---|---|---|
| JP | 61272671 A | 12/1986 |
| JP | 2005233615 A | 9/2005 |

OTHER PUBLICATIONS

International Search Report dated Mar. 26, 2013, for corresponding International Application No. PCT/JP2013/000794, 3 pages.

*Primary Examiner* — Bernarr Gregory
(74) *Attorney, Agent, or Firm* — Seed IP Law Group PLLC

(57) ABSTRACT

Provided is a device for detecting intruding objects that enables the detection of intruding objects without requiring antenna switching. Delay units (102) use different delay amounts to delay signals received at each of a plurality of antennas (110). A signal synthesis unit (103) synthesizes the delayed signals. A frequency conversion unit (106) converts the synthesized signal frequency to a baseband. A wave detection unit (107) detects the signal that has undergone frequency conversion. A radar profile generation unit (104) uses the detected signal to generate a profile formed from the distance from the antenna, and the signal strength at each distance from the antenna. A detection processing unit (105) detects a peak in the profile at which the signal strength exceeds a preset threshold value, and determines whether an intruding object is present in a detection region on the basis of the detected peak.

6 Claims, 16 Drawing Sheets

(51) Int. Cl.
*G01S 7/41* (2006.01)
*G01S 7/295* (2006.01)
*G01S 13/42* (2006.01)
*G01S 13/88* (2006.01)
*B61L 23/04* (2006.01)
*B61L 29/30* (2006.01)
*G01S 7/02* (2006.01)
*G01S 7/03* (2006.01)
*G01S 13/00* (2006.01)

(52) U.S. Cl.
CPC . *G01S 7/03* (2013.01); *G01S 7/295* (2013.01); *G01S 13/04* (2013.01); *G01S 13/42* (2013.01); *G01S 13/88* (2013.01)

(56) References Cited

U.S. PATENT DOCUMENTS

| | | | | |
|---|---|---|---|---|
| 3,603,995 | A * | 9/1971 | Howard | G01S 7/42 342/129 |
| 3,750,169 | A * | 7/1973 | Strenglein | G01S 13/931 342/72 |
| 3,971,020 | A * | 7/1976 | Howard | G01S 13/426 342/129 |
| 4,110,755 | A * | 8/1978 | Zottl | G01S 13/286 342/132 |
| 4,150,375 | A * | 4/1979 | Ross | G01S 13/931 342/93 |
| 4,156,240 | A * | 5/1979 | Strauch | G01S 3/465 342/156 |
| 5,285,209 | A * | 2/1994 | Sharpin | G01S 7/021 342/13 |
| 5,717,399 | A * | 2/1998 | Urabe | G01S 13/931 342/70 |
| 6,104,346 | A * | 8/2000 | Rudish | G01S 3/04 342/156 |
| 6,208,285 | B1 * | 3/2001 | Burkhardt | G01S 13/282 342/132 |
| 6,414,628 | B1 * | 7/2002 | Ashihara | G01S 13/931 342/118 |
| 6,459,402 | B1 * | 10/2002 | Tsunehara | G01S 5/10 342/118 |
| 6,633,251 | B1 * | 10/2003 | Huggett | G01S 7/38 342/14 |
| 6,653,969 | B1 * | 11/2003 | Birleson | G01S 7/36 342/379 |
| 7,082,172 | B1 * | 7/2006 | Pringle | G01S 7/021 342/13 |
| 8,290,495 | B2 * | 10/2012 | Park | H04B 7/01 342/59 |

* cited by examiner

DEVICE FOR DETECTING INTRUDING OBJECTS, AND METHOD FOR DETECTING INTRUDING OBJECTS

TECHNICAL FIELD

The present invention relates to an intruding object detection apparatus and an intruding object detection method.

BACKGROUND ART

Conventionally, intruding object detection apparatuses using a millimeter wave radar have been proposed for the purpose of detecting an intruding object in a region such as the interior of the crossing of a railroad.

For example, in Patent Literature (hereinafter, abbreviated as PTL) 1, an antenna and a reflective reference point of a radar are placed in a predetermined position of the region for detection, and a detection processing section determines existence of an intruding object on the basis of the relationship between a reflected wave (measurement reflected wave) measured and a reflected wave from the reflective reference point.

Moreover, in PTL 1, two or more reflective reference points and antennas are placed so as to eliminate any region in which an intruding object cannot be detected (non-detected region) in a region for detection, such as a crossing, and the intruding object is detected over the whole region for detection by suitably switching the antenna which receives a signal inputted into the detection processing section.

CITATION LIST

Patent Literature

PTL1
Japanese Patent Application Laid-Open No. 2005-233615

SUMMARY OF INVENTION

Technical Problem

However, in the case of switching the antenna which receives a signal inputted into the detection processing section like above-mentioned PTL 1, the omission in detection of the intruding object may occur depending on timing of switching the antenna and a place in which or timing at which the object intrudes into the region for detection. Moreover, PTL 1 needs a processing section for switching the antenna receiving a signal inputted into the detection processing section, and leads an increase in cost of the intruding object detection apparatus.

It is an object of the present invention to provide an intruding object detection apparatus and an intruding object detection method that can detect an intruding object without the need for switching of antennas.

Solution to Problem

An intruding object detection apparatus according to an aspect of the present invention is an apparatus that detects intrusion of an object into a region for detection, the apparatus including: an input section that receives signals reflected by a same object existing in the region for detection, using at least two respective antennas among a plurality of antennas; a delay section that delays the signals received respectively using the plurality of antennas using delay amounts that are different from each other, a combining section that combines the delayed signals; a frequency conversion section that frequency-converts the resultant combined signal into a baseband; a detection section that detects the frequency-converted signal; a generation section that generates a profile including distances from the antennas and signal intensity for each of the distances from the antennas using the detected signal; and a detection process section that detects a peak having the signal intensity exceeding a predetermined threshold in the profile and judges whether an intruding object exists in the region for detection based on the detected peak.

An intruding object detection method according to an aspect of the present invention is a method for detecting intrusion an object into a region for detection, the method including: receiving signals reflected by a same object existing in the region for detection, using at least two respective antennas among a plurality of antennas; delaying the signals received using the plurality of antennas using delay amounts that are different from each other, combining the respective delayed signals; frequency-converting the resultant combined signal into a baseband; detecting the frequency-converted signal; generating a profile including distances from the antennas and signal intensity for each of the distances from the antennas using the detected signal; and detecting a peak having the signal intensity exceeding a predetermined threshold in the profile, and judging whether an intruding object exists in the region for detection based on the detected peak.

Advantageous Effects of Invention

The present invention can detect an intruding object without the need for switching of antennas.

DESCRIPTION OF EMBODIMENTS

The embodiments of the present invention will be described in detail with reference to the accompanying drawings. In embodiments, the same components are designated with the same reference signs, and repetitive explanations thereof will be omitted.

Embodiment 1

Configuration of Intruding Object Detection System

Figure 1:
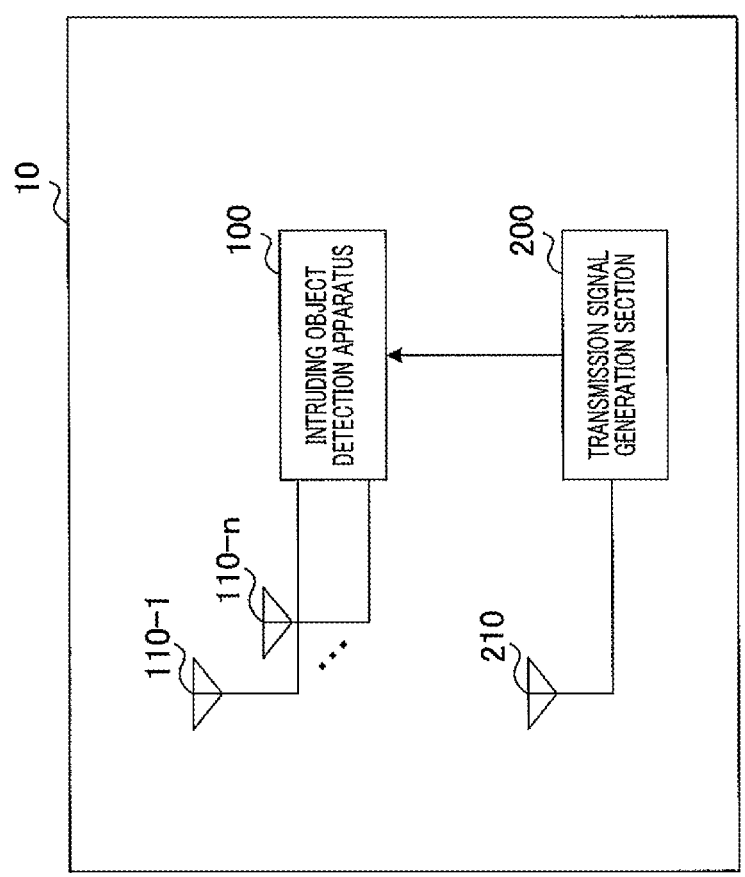
FIG. 1 is a block diagram illustrating a configuration of an intruding object detection system according to Embodiment 1 of the present invention.

FIG. 1 illustrates a main configuration of intruding object detection system 10 according to Embodiment 1 of the present invention. Intruding object detection system 10 includes intruding object detection apparatus 100, n receiving antennas 110-1 to 110-n, transmission signal generation section 200, and transmitting antenna 210.

In FIG. 1, intruding object detection apparatus 100 detects intrusion of an object into an "intruding object detection region" on the basis of a reflected wave (signal reflected at the intruding object) of a transmission signal emitted from transmitting antenna 210. Transmission signal generation section 200 generates a pulse and periodically emits the generated pulse (transmission signal) towards the "intruding object detection region" through transmitting antenna 210. Moreover, transmission signal generation section 200 reports timing of periodically emitting a transmission signal to intruding object detection apparatus 100.

Here, the "intruding object detection region" refers to a region that is targeted for detection of an intruding object and that is surrounded by the boundary of the region for detection (hereinafter referred to as "intruding object detection boundary") and the point of mounting intruding object detection system 10. For example, FIG. 2 and FIG. 3 illustrate examples of mounting intruding object detection system 10.

Figure 2:
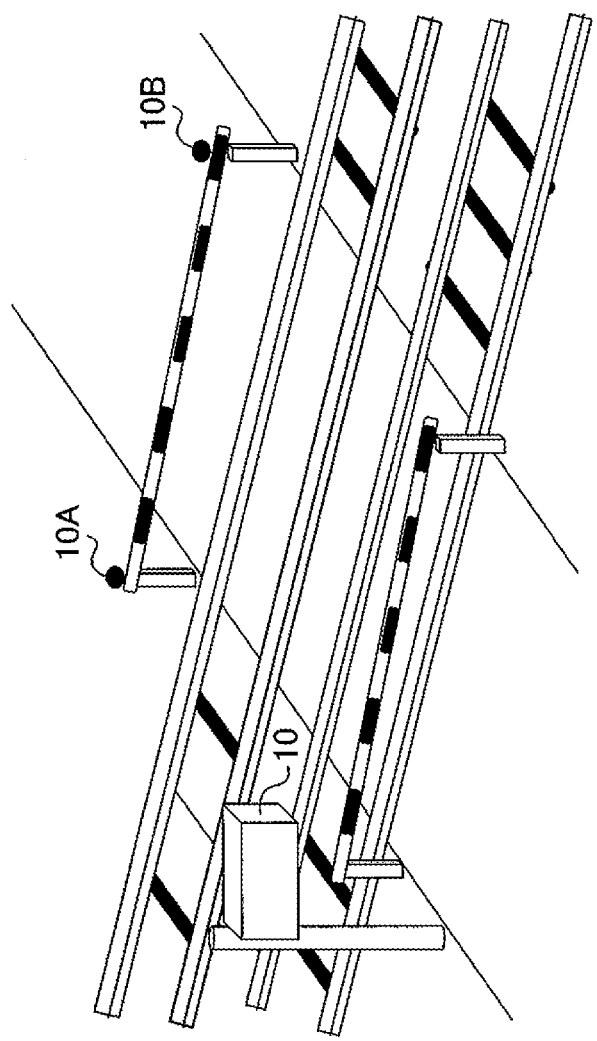
FIG. 2 illustrates an example of an intruding object detection region according to Embodiment 1 of the present invention.

FIG. 2 illustrates the example of mounting intruding object detection system 10 in the crossing of a railroad. In FIG. 2, intruding object detection system 10 is a system detecting an object intruding into a crossing. That is, in FIG. 2, the "intruding object detection boundary" is represented as a line segment connecting one endpoint 10A of the crossing and endpoint 10B on the other side. The "intruding object detection region" is represented as a region surrounded by a line segment connecting the point of mounting intruding object detection system 10, endpoint 10A, and endpoint 10B.

Figure 3:
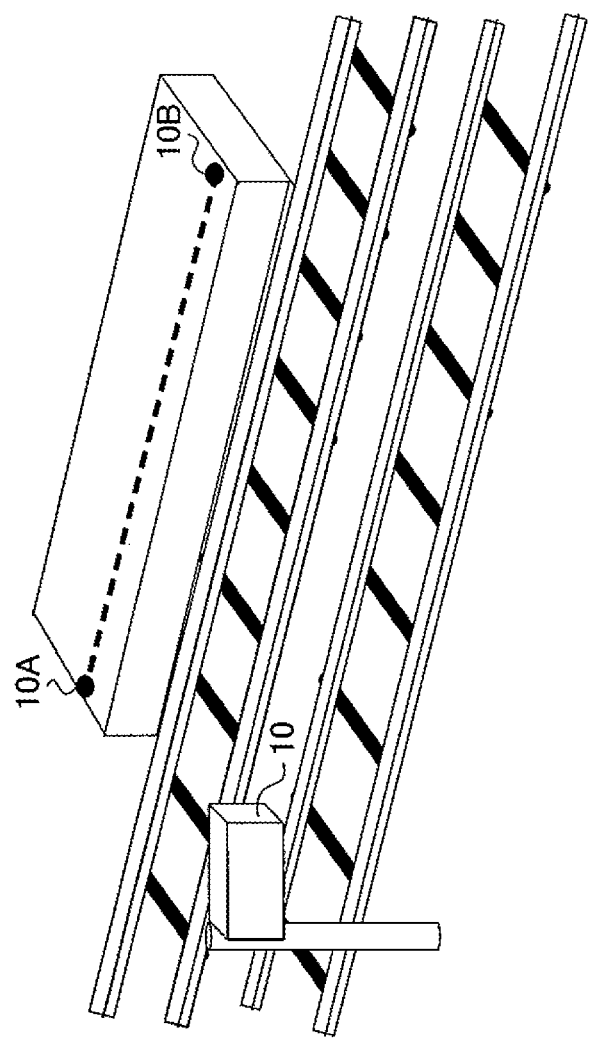
FIG. 3 illustrates an example of the intruding object detection region according to Embodiment 1 of the present invention.

FIG. 3 illustrates the example of mounting intruding object detection system 10 in the platform of a station of a railroad. In FIG. 3, intruding object detection system 10 is a system detecting an object intruding from the platform into a railway track. That is, in FIG. 3, the "intruding object detection boundary" is represented as a line segment connecting one endpoint 10A of the boundary between the platform and the railway track, and endpoint 10B on the other side. The "intruding object detection region" is represented as a region defined by a line segment connecting the point of mounting intruding object detection system 10, endpoint 10A, and endpoint 10B.

Transmitting antenna 210 is mounted and designed so that the entire intruding object detection region described above can be covered. For example, the directivity direction (the center of the emission direction) of transmitting antenna 210 is designed so as to be directed towards the center (the midpoint of endpoint 10A and endpoint 10B illustrated in FIG. 2 or FIG. 3) of intruding object detection region. Moreover, the half-value angle of transmitting antenna 210 is designed on the basis of the angle defined by endpoint 10A, intruding object detection system 10, and endpoint 10B. Thereby, transmitting antenna 210 periodically emits a transmission signal towards the entire intruding object detection region.

Configuration of Intruding Object Detection Apparatus

Figure 4:
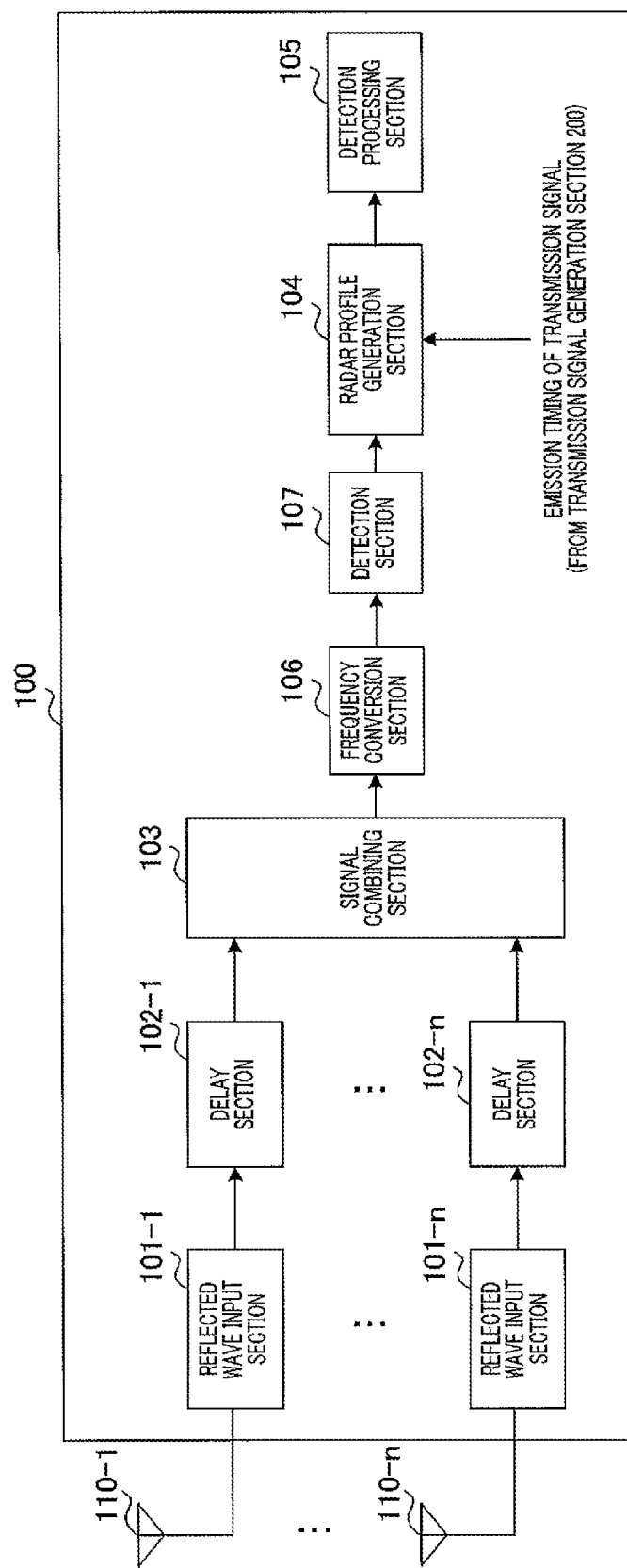
FIG. 4 is a block diagram illustrating a configuration of an intruding object detection apparatus according to Embodiment 1 of the present invention.

FIG. 4 illustrates a configuration of intruding object detection apparatus 100 according to Embodiment 1 of the present invention. In FIG. 4, intruding object detection apparatus 100 has reflected wave input section 101, delay section 102, signal combining section 103, frequency conversion section 106, orthogonal detection section 107, radar profile generation section 104, and detection processing section 105.

According to the number of receiving antennas 110 (n antennas in FIG. 4), two or more reflected wave input sections 101 and two or more delay sections 102 (n antennas in FIG. 4) are provided. Specifically, reflected wave input section 101-1 and the delay section 102-1 are provided corresponding to receiving antenna 110-1, and reflected wave input section 101-n and delay section 102-n are provided corresponding to receiving antenna 110-n.

Reflected wave input sections 101 respectively receive reflected waves from an object receiving transmission signals emitted from transmitting antennas 210 as received signals, through corresponding receiving antennas 110. Reflected wave input section 101 outputs the received signal to delay section 102.

Respective delay sections 102 delay received signals inputted from corresponding reflected wave input sections 101, using delay amounts that are different from each other. For example, delay section 102 may generate delay by including a transmission line or a delay element in its inside.

As illustrated in FIG. 4, each delay section 102 is provided between corresponding reflected wave input section 101 and signal combining section 103 described below. In the present embodiment, respective delay sections 102 set the above-described delay amounts that are different from each other, so as to equalize path lengths between intersection points of the intruding object detection boundary and the directivity directions of respective receiving antennas 110, and signal combining section 103 among multiple receiving antennas 110. More specifically, respective delay sections 102 set the above-described delay amounts that are different for respective received signals inputted from reflected wave input sections 101, so as to equalize path lengths after transmission signals are emitted from transmitting antenna 210 until received signals (reflected waves) reach signal combining section 103, with respect to objects existing in respective intersection points of the intruding object detection boundary and the directivity directions of respective receiving antennas 110.

Signal combining section 103 combines a received signal inputted from each delay section 102, and outputs the combined received signal to frequency conversion section 106.

Frequency conversion section 106 receives a signal in a high frequency band outputted from signal combining section 103, down-converts the inputted signal in a high frequency band into a baseband, and outputs the down-converted signal to detection section 107.

Detection section 107 detects the signal generated in transmission signal generation section 200, from the baseband signal outputted by frequency conversion section 106, and outputs the detected signal to radar profile generation section 104.

Radar profile generation section 104 receives the signal outputted from detection section 107, and receives information on emission timing of a transmission signal from transmission signal generation section 200 (FIG. 1). Radar profile generation section 104 generates a radar profile using the emission timing of a transmission signal and the received signal. Here, a "radar profile" includes the distance of receiving antenna 110, and reflective intensity (signal intensity) for each distance.

Specifically, radar profile generation section 104 first digitizes a signal outputted from detection section 107. Then, radar profile generation section 104 calculates the cross-correlation of the digitized baseband signal and the transmission signal, and thereby specifies how long the received signal delays being received by reflected wave input section 101 from the emission timing of a transmission signal and how intense the received signal is. In this case, radar profile generation section 104 does not use a signal received in the period from the emission start of a transmission signal until the emission completion of the transmission signal for generation of a radar profile, and determines the length of the radar profile according to the transmitting cycle of the transmission signal. In this way, radar profile generation section 104 periodically generates a radar profile including the "distance" representing how long the received signal delays being received by reflected wave input section 101, and "reflective intensity" representing how intense the received signal is for each distance, in synchronization with the transmitting cycle of a transmission signal.

Detection processing section 105 detects a peak of reflective intensity exceeding a predetermined threshold (threshold for boundary detection) in the radar profile inputted from radar profile generation section 104, and judges whether an object intruding into the intruding object detection region exists on the basis of the detected peak. In the present embodiment, detection processing section 105 compares the signal intensity (reflective intensity) in the radar profile and the threshold, and judges that an object intruding into the intruding object detection region exists when detecting the signal intensity (peak) exceeding the threshold. When detecting existence of an intruding object, detection processing section 105 outputs information representing that the existence of the intruding object is detected. The information representing that the intruding object is detected may be outputted, for example, to a control apparatus (not illustrated), such as a traffic light control apparatus, and may be utilized.

Operations of Intruding Object Detection Apparatus 100

Operation of intruding object detection apparatus 100 having the above configuration will be explained.

In the following explanation, intruding object detection system 10 includes three receiving antennas 110-1, 110-2, and 110-3 (that is, the case of n=3) as an example. However, the number of receiving antennas 110 is not limited to three and may be two or more.

How to Mount Receiving Antennas 110

Figure 5:
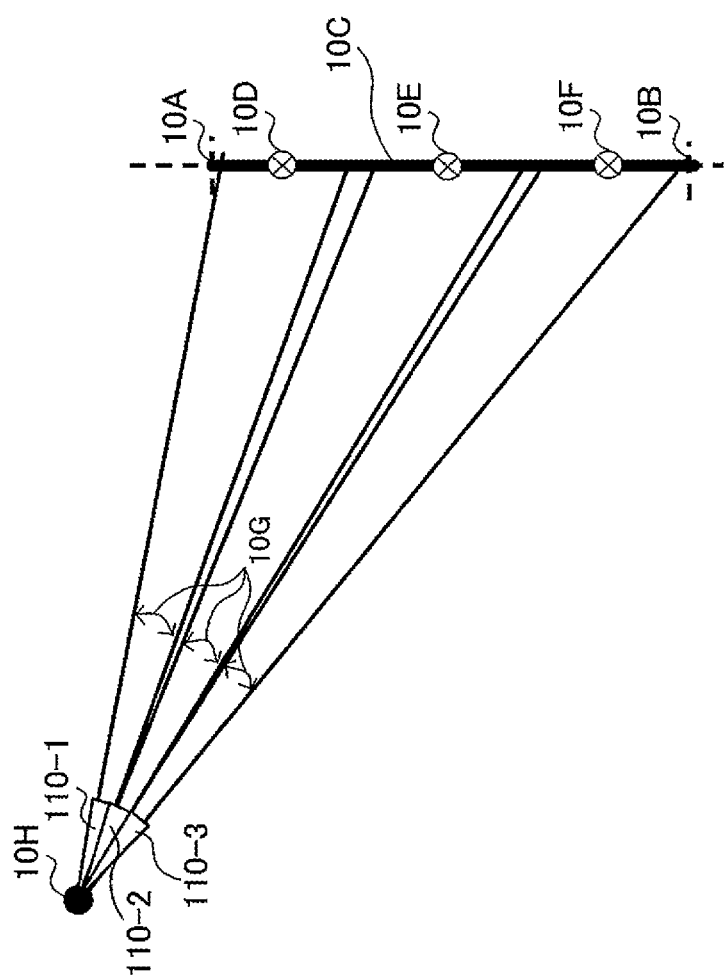
FIG. 5 illustrates an intruding object detection boundary and the receiving regions of respective receiving antennas according to Embodiment 1 of the present invention.

FIG. 5 illustrates an example of how to mount receiving antennas 110-1 to 110-3. FIG. 5 illustrates a state of point 1 OH (mounting point of receiving antenna 110) of mounting intruding object detection system 10 and intruding object detection boundary 10C viewed from the above. In this explanation, intruding object detection system 10 and receiving antenna 110 are integrated. However, intruding object detection system 10 and receiving antenna 110 do not need to be integrated.

Receiving antennas 110-1 to 110-3 each have the same property. In FIG. 5, the half-value angle of each of receiving antennas 110-1 to 110-3 is referred to as 10G. Moreover, in FIG. 5, point 10D on intruding object detection boundary 10C is the intersection point of the directivity direction of receiving antenna 110-1 and intruding object detection boundary 10C. Similarly, point 10E on intruding object detection boundary 10C is the intersection point of the directivity direction of receiving antenna 110-2 and intruding object detection boundary 10C, and point 10F on intruding object detection boundary 10C is the intersection point of the directivity direction of the receiving antenna 110-3 and intruding object detection boundary 100C.

As illustrated in FIG. 5, receiving antennas 110-1 to 110-3 are mounted towards intruding object detection boundary 10C so as not to overlap the directivity direction of the antennas with each other. Furthermore, receiving antennas 110-1 to 110-3 are mounted so that each interval between the intersection points (10D, 10E, and 10F) described above may be equal to or less than half of the width of the reflective surface of an object for intrusion detection. For example, as illustrated in FIG. 5, the interval between intersection points (10D, 10E) of intruding object detection boundary 10C and respective directivity directions of receiving antenna 110-1 and receiving antenna 110-2 that have adjacent receiving regions is equal to or less than half of the width of the reflective surface (that is, the surface on which a transmission signal can be reflected) of the object for intrusion detection.

Accordingly, an object for intrusion detection existing on intruding object detection boundary 10C always exists while straddling the insides of the receiving regions of two or more receiving antennas 110. Thereby, reflected wave input section 101 receives a signal (reflected wave) reflected by the same object for intrusion detection existing in the intruding object detection region (in this case, on intruding object detection boundary 10C) with each of at least two receiving antennas 110 among multiple receiving antennas 110.

Delay Process

In FIG. 5, the distance between point 10H and point 10D is referred to as distance A, the distance between point 10H and point 10E is distance B, and the distance between point 10H and point 10F is distance C. In this case, delay section 102 corresponding to each receiving antenna 110 sets a delay amount added to a received signal on the basis of the difference between distances A, B, and C.

For example, a case will be explained where the delay amount in delay section 102-3 corresponding to receiving antenna 110-3 is set to 0 on the basis of receiving antenna 110-3.

In this case, delay section 102-2 corresponding to receiving antenna 110-2 sets the delay amount corresponding the double of the difference between distance B and distance C. Similarly, delay section 102-1 corresponding to receiving antenna 110-1 sets the delay amount corresponding the double of the difference between distance A and distance C.

That is, delay sections 102-1 to 102-3 set the delay amounts according to the differences between the distances between receiving antennas 110-1 to 110-3 and the intersection points (10D, 10E, 10F) corresponding to respective receiving antennas 110 on intruding object detection boundary 10C, respectively. Thereby, the path lengths on which transmission signals (pulses) emitted from point 10H illustrated in FIG. 5 reflects on point 10D, point 10E, and point 10F and reach signal combining section 103 through reflected wave input sections 101-1 to 101-3 and delay sections 102-1 to 102-3, respectively, are equal among the multiple receiving antennas 110.

Radar Profile Generation Process

Figure 6:
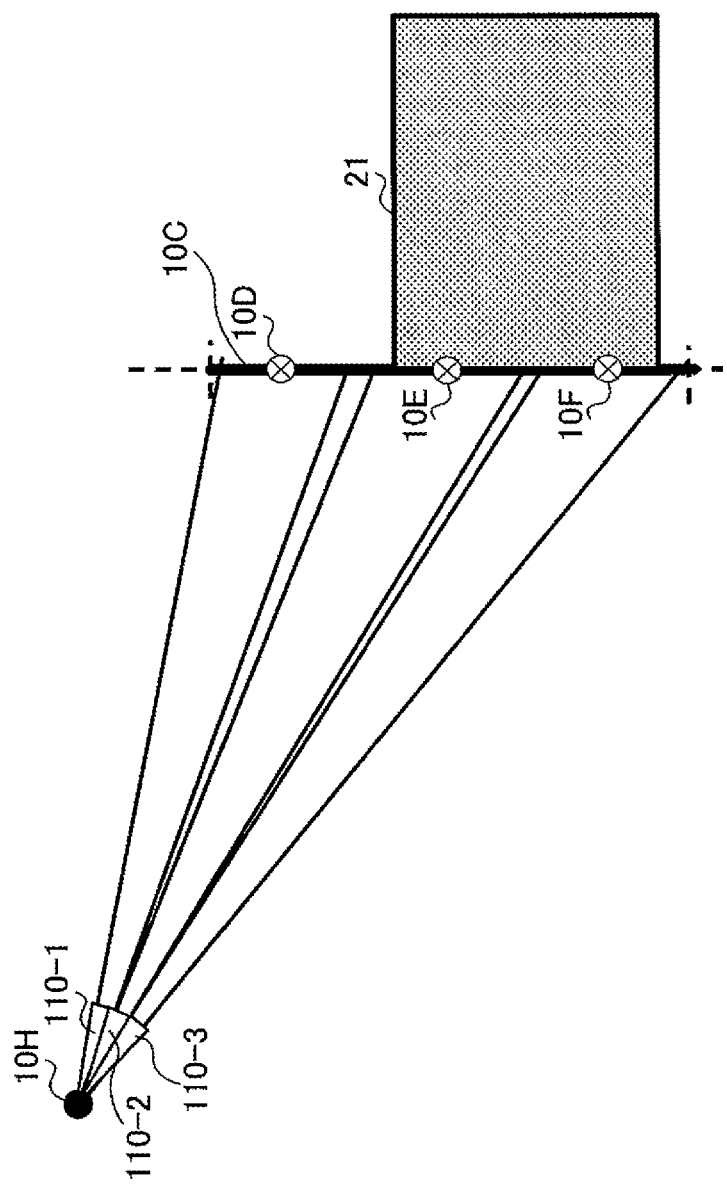
FIG. 6 explains an intruding object detection process according to Embodiment 1 of the present invention.

FIG. 6 illustrates a case where intruding object 21 exists on intrusion detection boundary 10C. Intruding object 21 is, for example, a vehicle.

Figure 7:
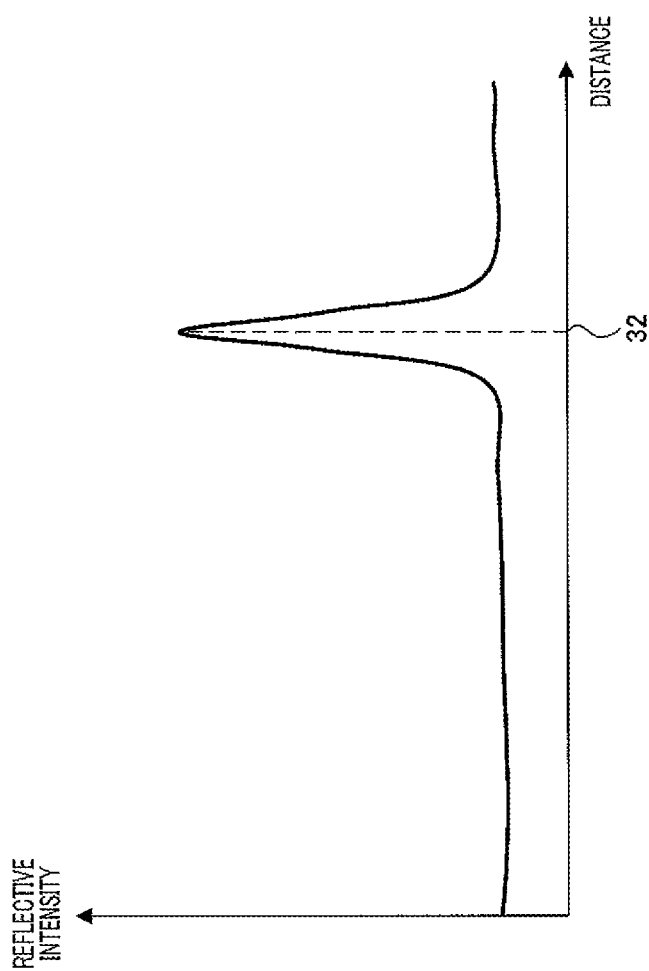
FIG. 7 illustrates an example of a radar profile according to Embodiment 1 of the present invention.

FIG. 7 illustrates an example of a radar profile generated in radar profile generation section 104 in the state illustrating in FIG. 6. In FIG. 7, a horizontal axis represents a distance from mounting point 10H of intruding object detection system 10, and a vertical axis represents reflective intensity (namely, signal intensity of a received signal). As illustrated in FIG. 7, a reflected wave from intruding object 21 has a peak in distance 32.

In FIG. 6, since intruding object 21 exists while straddling the insides of the receiving regions of receiving antennas 110-2 and 110-3, reflected waves from intruding object 21 are received through receiving antennas 110-2 and 110-3 in two reflected wave input sections 101 that are reflected wave input sections 101-2 and 101-3. In FIG. 6, a reflected wave from intruding object 21 on intruding object detection boundary 10C received in reflected wave input section 101-2 arrives earlier than a reflected wave from intruding object 21 received in reflected wave input section 101-3, by the double of the difference between distance B and distance C. Moreover, a delay amount is set as 0 in delay section 102-3, and a delay amount corresponding to the double of the difference between distance B and distance C is set in delay section 102-2.

Thereby, signal combining section 103 combines signals received in two reflected wave input sections 101-2 and 101-3, as signals received through the same path length. Here, since receiving antenna 110-3 is set as the reference, signal combining section 103 combines a signal received in each of reflected wave input sections 101-2 and 101-3 as a signal received through the path between point 10F and point 10H illustrate in FIG. 6. In this manner, a radar profile generated in radar profile generation section 104 has a peak representing a state where signals received in two reflected wave input sections 101-2 and 101-3 are combined as signals through the same distance. That is, as illustrated in FIG. 7, the radar profile has one peak centering on distance 32 corresponding to point 10F illustrated in FIG. 6.

Peak Detection Process

As described above, intruding object 21 on intruding object detection boundary 10C illustrated in FIG. 6 exists while straddling the inside of receiving regions of at least two receiving antennas 110. Therefore, received signals received in multiple reflected wave input sections 101 corresponding to at least two receiving antennas 110 are combined in the same distance in the radar profile, and forms a peak. That is, in the case of a reflected wave from intruding object 21 on intruding object detection boundary 10C, the amplitude of a peak (reflective intensity) appearing in the radar profile is larger than reflective intensity that can be taken by a reflected wave from intruding object 21 received in one receiving antenna 110.

Consequently, detection processing section 105 sets a larger value than reflective intensity that can be taken by a reflected wave from the intruding object received in one receiving antenna 110, as a threshold. For example, where the distance from reflected wave input section 101 is d, and a reflective cross section of an object targeted for detecting the intrusion is σ, threshold Th(d) may be set in a range satisfying the conditions of Expression 1.

[1]

$$Th(d) > K\sigma/d^4 \quad \text{(Expression 1)}$$

Here, K represents signal electric power and is a constant determined by, for example, the property of receiving antenna 110. The value of the right side of expression 1 is considered as reflective intensity from an intruding object received by one reflected wave input section 101.

Figure 8:
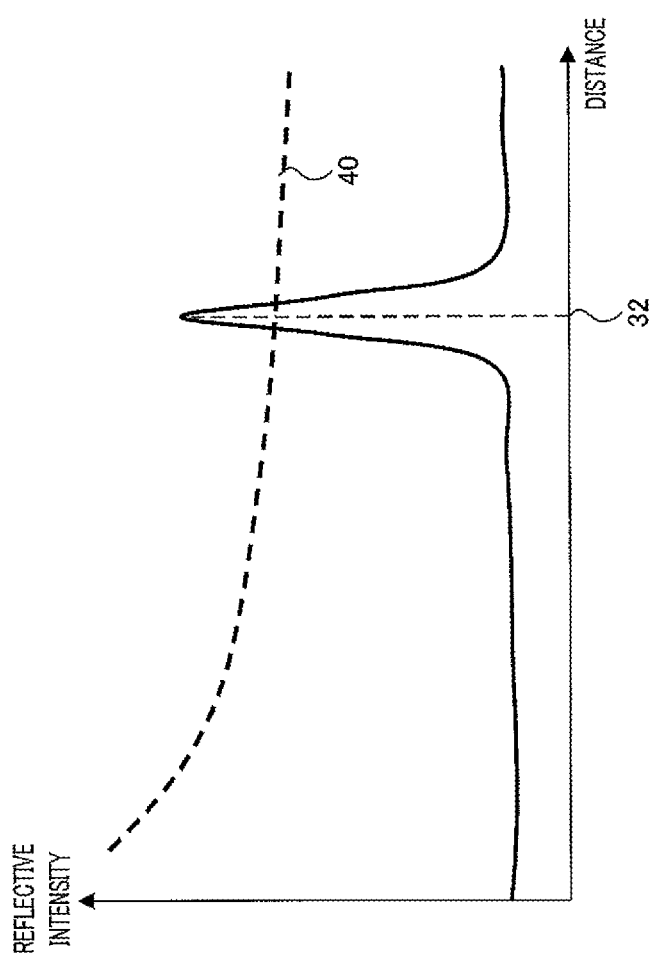
FIG. 8 explains a peak detection process according to Embodiment 1 of the present invention.

Detection processing section 105 judges whether a peak having reflective intensity exceeding the threshold exists in the radar profile generated in radar profile generation section 104. Specifically, detection processing section 105 judges that an intruding object exists in the intruding object detection region (here, on intruding object detection boundary 10C), when detecting a peak having reflective intensity exceeding the threshold in the radar profile. FIG. 8 illustrates threshold 40 (dashed line) for the radar profile illustrated in FIG. 7. In FIG. 8, detection processing section 105 detects a peak having reflective intensity exceeding the threshold in distance 32, and detects that an intruding object exists in intruding object detection boundary 10C.

Figure 9:
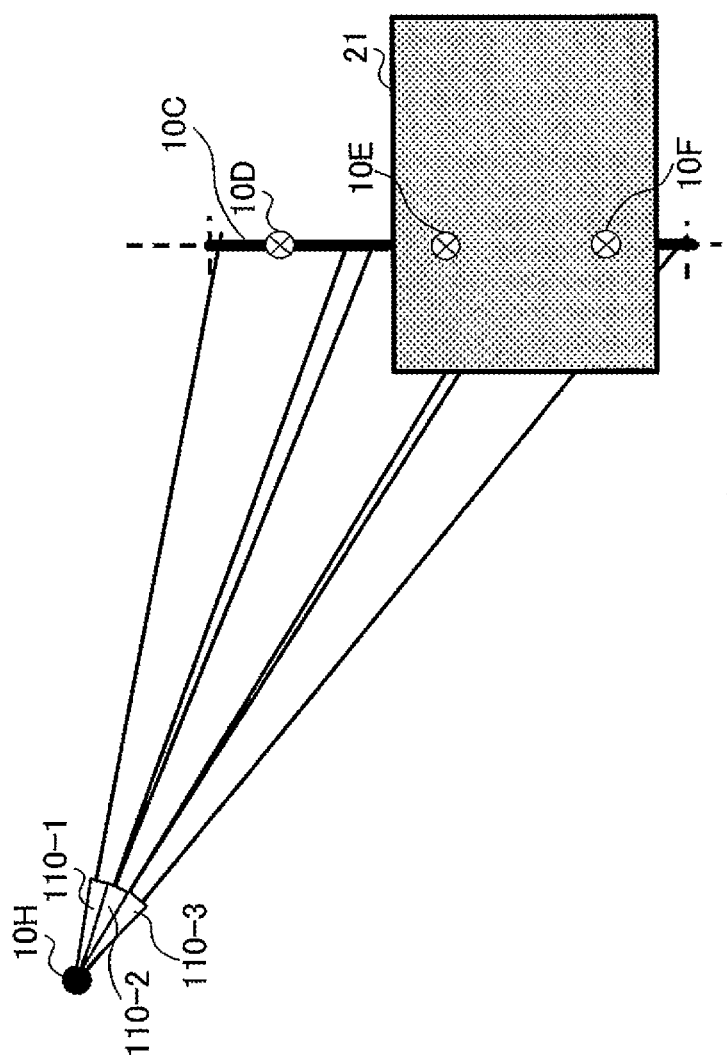
FIG. 9 explains the intruding object detection process according to Embodiment 1 of the present invention.

Next, a case where intruding object 21 does not exist on intruding object detection boundary 10C will be explained. For example, FIG. 9 illustrates a case where the reflective surface of intruding object 21 exists in the intrusion detection region across intruding object detection boundary 10C. Moreover, FIG. 10 illustrates an example of a radar profile generated in radar profile generation section 104 in the state illustrating in FIG. 9.

Figure 10:
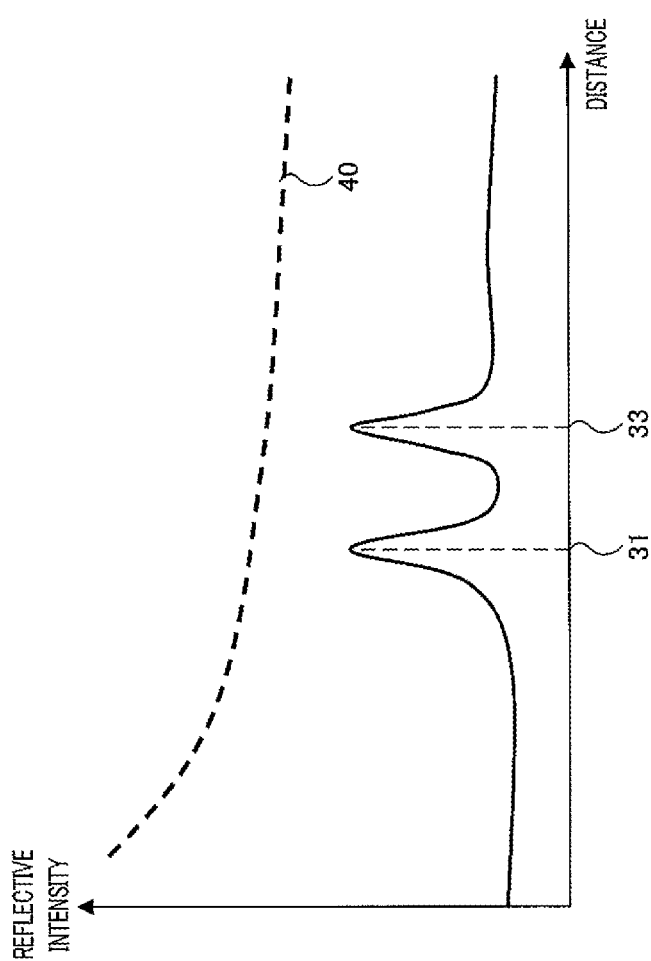
FIG. 10 explains the peak detection process according to Embodiment 1 of the present invention.

As illustrated in FIG. 10, in radar profile generated when a reflected wave from intruding object 21 is received, peaks appear in two places, i.e., distance 31 and distance 33. This is because the delay amounts set in respective delay section 102 are set so as to equalize the path lengths of signals reflected on intrusion detection boundary 10C among receiving antennas 110. That is, as illustrated in FIG. 9, with respect to reflected waves from intruding object 21 existing in the intrusion detection region across intrusion detection boundary 10C top, path lengths until reaching signal combining section 103 differ for respective receiving antennas 110-1 to 110-3. As a result, peaks corresponding to reflected waves received in respective reflected wave input sections 101-2 and 101-3 individually appear in the radar profile illustrated in FIG. 10.

That is, the amplitudes of peaks appearing in distances 31 and 33 illustrated in FIG. 10 correspond to reflective intensity from the intruding object received by one reflected wave input section 101. Therefore, since both of the peak in distance 31 and the peak in distance 33 are smaller than threshold 40 in FIG. 10, detection processing section 105 does not detect that an intruding object exists in intrusion detection boundary 10C.

In this way, since a delay amount in delay section 102 is set using intruding object detection boundary 10C as the reference, a peak exceeding threshold 40 is generated only in a reflected wave from an object on intrusion detection boundary region 10C. Therefore, only when an intrusion detection object exists on intruding object detection boundary 10C, detection processing section 105 can detect intrusion of the object. Accordingly, intruding object detection apparatus 100 can detect only the time of an intruding object intruding into intruding object detection boundary 10C, without requiring a process of comparing the distance of a peak and the distance from the intruding object detection boundary.

According to the present embodiment, intruding object detection apparatus 100 can detect only intrusion of an object existing on intruding object detection boundary 10C, as described above. Moreover, intruding object detection apparatus 100 receives reflected waves from an object for intrusion detection in at least two receiving antennas 110, and thereby can detect intrusion of the object to intruding object detection boundary 10C, without switching of receiving antennas 110. Consequently, an intruding object can be detected without the need for switching of antennas. Moreover, in the present embodiment, since a processing section for switching of antennas is unnecessary, an increase in cost of intruding object detection apparatus 100 can be avoid.

In addition, when a peak having reflective intensity exceeding threshold 40 is detected in the radar profile, and when a distance in the radar profile corresponding to the detected peak (distance 32 in FIG. 8) corresponds to the vicinity of intruding object detection boundary 10C, detection processing section 105 may judge that an intruding object exists in intruding object detection boundary 10C. That is, detection processing section 105 may compare a distance (distance 32 in FIG. 8) corresponding to a peak exceeding threshold 40 and an actual distance to intruding object detection boundary 10C (the distance between point 10H and point 10F in FIG. 6), check that an object exists near intruding object detection boundary 10C, and then output information representing that the intruding object is detected.

Moreover, the present embodiment has been explained in an example case where a vehicle is assumed as an intruding object. However, a person may be assumed as an object for intrusion detection, and the antenna directivity direction of receiving antenna 110 may be set based on the width of the person. With this configuration, even for an object, such as a person having a small width in comparison with a vehicle, reflected waves from the same object can be received in multiple reflected wave input sections 101. Thus, intrusion of a person can be detected in the intruding object detection boundary like the present embodiment. Thereby, for example, the white line on the platform of the station illustrated in FIG. 3 is set as a boundary (intruding object detection boundary), and this enables intruding object detection apparatus 100 to announce detection of an intruding object when a person intrudes across the white line into the railway track side.

Embodiment 2

In Embodiment 1, the receiving regions of the multiple receiving antennas included in the intruding object detection system are set so as not to overlap with each other. In contrast to this, the present embodiment will be explained in a case where the receiving regions of the multiple receiving antennas included in the intruding object detection system are set so as to overlap with each other.

Figure 11:
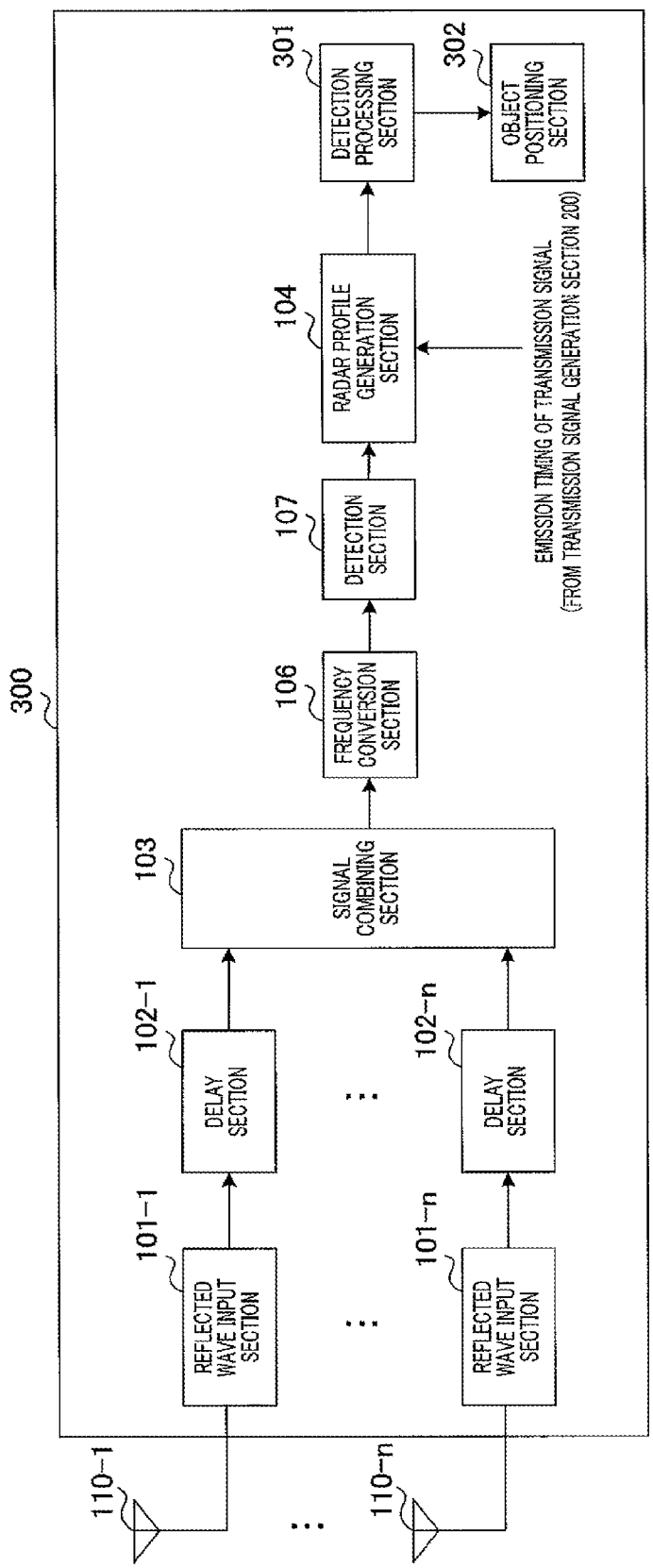
FIG. 11 is a block diagram illustrating a configuration of an intruding object detection apparatus according to Embodiment 2 of the present invention.

FIG. 11 illustrates intruding object detection apparatus 300 according to Embodiment 2 of the present invention. In intruding object detection apparatus 300 illustrated in FIG. 11, the same elements as those in Embodiment 1 (FIG. 4) are designated with the same reference signs, and repetitive descriptions thereon will be omitted. Specifically, intruding object detection apparatus 300 illustrated in FIG. 11 involves different operations of detection processing section 301 and newly includes object positioning section 302, in comparison with intruding object detection apparatus 100 illustrated in FIG. 4. Intruding object detection system 10 according to the present embodiment includes intruding object detection apparatus 300 instead of intruding object detection apparatus 100 illustrated in FIG. 1.

In intruding object detection system 10 according to the present embodiment, the antenna half-value angle of each of multiple receiving antennas 110 is set so as to overlap with the receiving region of another receiving antenna 110. That is, multiple receiving antennas 110 are mounted so that at least two receiving antennas 110 may receive reflected waves from an object for intrusion detection.

Figure 12:
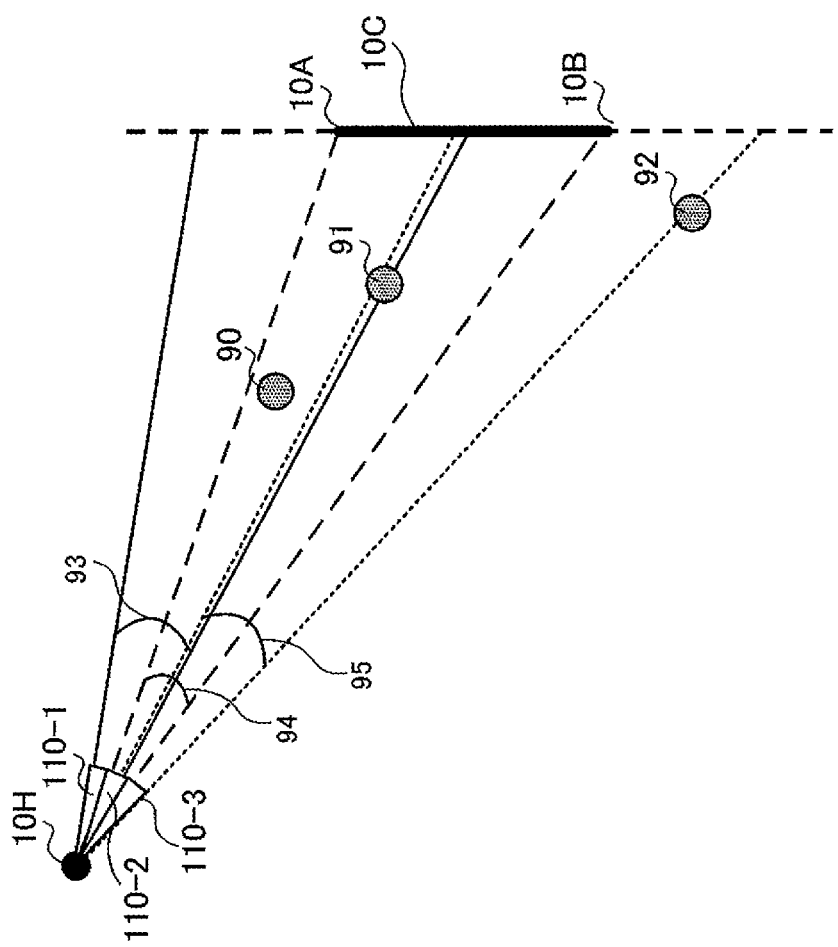
FIG. 12 illustrates an intruding object detection boundary and the receiving regions of respective receiving antennas according to Embodiment 2 of the present invention.

FIG. 12 explains mounting conditions for receiving antennas 110 according to the present embodiment. In the following explanation, intruding object detection system 10 includes three receiving antennas 110-1, 110-2, and 110-3 (that is, the case of n=3) as an example.

Receiving antenna 110-1, 110-2, and 110-3 illustrated in FIG. 12 have antenna half-value angles that are angle 93, angle 94, and angle 95, respectively. Here, as illustrated in FIG. 12, the receiving region of each receiving antenna 110 overlaps with the receiving region of another receiving antenna 110. For example, in FIG. 12, the region of approximately half of the receiving region of each receiving antenna 110 is mounted so as to overlap with the receiving regions of adjoining receiving antennas 110.

Moreover, as illustrated in FIG. 12, receiving antennas 110 are mounted towards intruding object detection boundary 10C so that regions not overlapping with the receiving region of any other receiving antennas 110 are set as the outside of a region for intruding object detection. In FIG. 12, a region not overlapping with the receiving region of receiving antenna 110-2 in the receiving region of receiving antenna 110-1 and a region not overlapping with the receiving region of receiving antenna 110-2 in the receiving region of receiving antenna 110-3 are set as the outside of a region for intruding object detection. That is, the intruding object detection region is set in a region where the receiving regions of at least two receiving antennas 110 of multiple receiving antennas 110 overlap with each other.

In this manner, any position in the intruding object detection region corresponds to the receiving region of at least two receiving antennas 110. Therefore, intruding object detection apparatus 300 (reflected wave input section 101) receives respective waves reflected from the same object for intrusion detection in the intruding object detection region through at least two receiving antennas 110 of multiple receiving antennas 110 like Embodiment 1.

In intruding object detection apparatus 300 illustrated in FIG. 11, detection processing section 301 detects a peak exceeding a predetermined threshold in the radar profile generated in radar profile generation section 104 like Embodiment 1 (detection processing section 105). However, the threshold set in detection processing section 301 is set to a value smaller than reflective intensity that can be taken by a reflected wave received in one receiving antenna 110.

In intruding object detection apparatus 300, reflected waves from the same object are received by multiple receiving antennas 110, and respective received signals are subject to delay processes involving different delay amounts. In this case, in signal combining section 103, the reflected waves received with respective receiving antenna 110 have path lengths that differ corresponding to the differences in the delay amounts of the delay processes performed on respective received signals. That is, in a radar profile generated in radar profile generation section 104, peaks corresponding to the reflected waves from the same object appear in the distances corresponding to the differences in the delay amounts in the delay processes performed on reflected waves received with respective receiving antennas 110. That is, two peaks separated by the distance corresponding to the difference in delay amounts set in respective delay sections 102 represent peaks caused by the reflected waves from the same object.

Consequently, when detecting at least two peaks having reflective intensity exceeding the threshold in the radar profile, detection processing section 301 operates as follows. That is, when the distance difference between at least two detected peaks is equal to the distance corresponding to the difference in the delay amounts for reflected waves received with at least two specific receiving antennas 110 among multiple receiving antennas 110, detection processing section 301 judges that an intruding object exists in the intruding object detection region. For example, in FIG. 12, examples of the distance corresponding to the difference in the delay amounts for reflected waves received with at least two specific receiving antennas 110 is given as follows. Such examples are given as the distance corresponding to the difference between the delay amount set in delay section 102-1 and the delay amount set in delay section 102-2, and the distance corresponding to the difference between the delay amount set in delay section 102-2 and the delay amount set in delay section 102-3.

When detecting existence of an intruding object, detection processing section 301 outputs information representing that the existence of the intruding object is detected. Moreover, detection processing section 301 outputs peak position information representing the distance corresponding to each detected peak, to object positioning section 302.

Object positioning section 302 estimates the position (direction and distance) of the object existing in the intruding object detection region on the basis of the peak position information inputted from detection processing section 301 and the difference in the delay amounts set in respective delay sections 102, and generates object positioning information representing the position of the object.

The information representing detection of the intruding object and the object positioning information obtained as described above may be outputted, for example, to a control apparatus (not illustrated), such as a traffic light control apparatus, and may be utilized.

Figure 13:
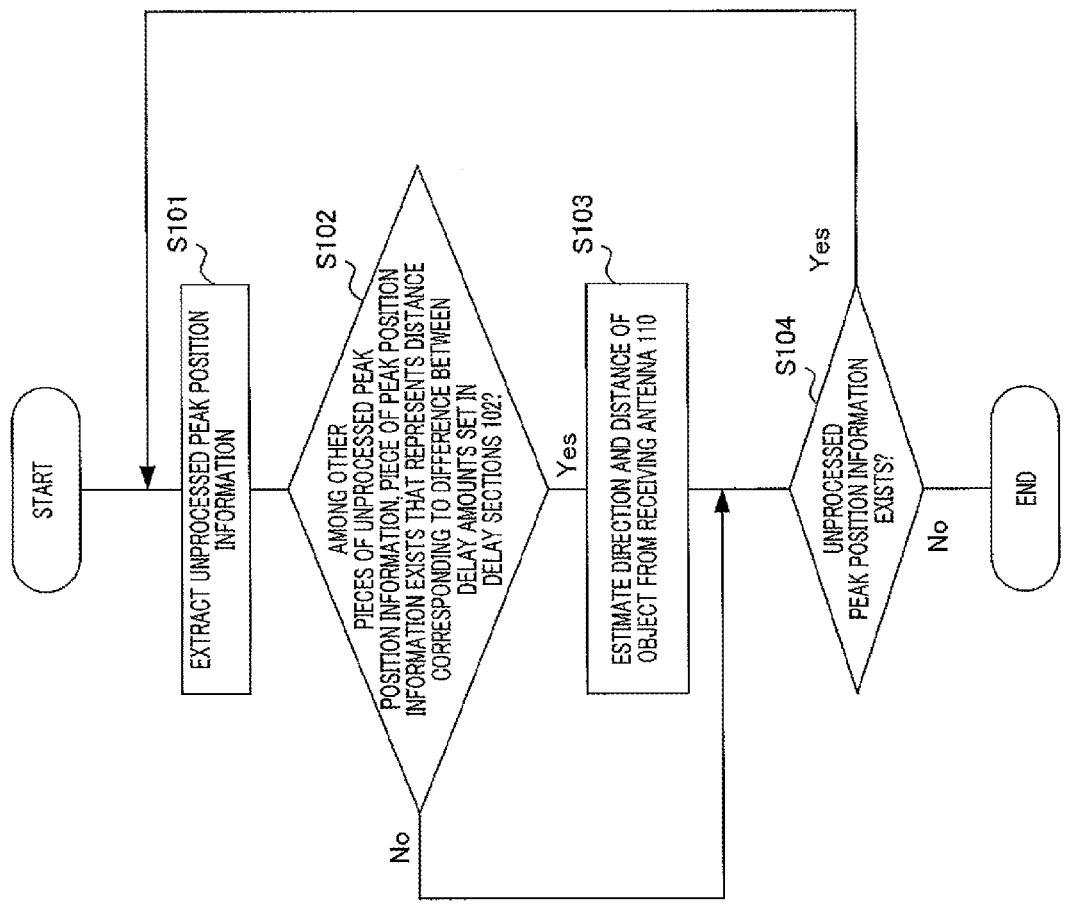
FIG. 13 is a flow diagram illustrating the flow of a generation process on object positioning information according to Embodiment 2 of the present invention.

FIG. 13 is a flow diagram illustrating an example of the flow of a generation process on object positioning information in object positioning section 302.

In Step (hereinafter referred to as "S") 101 in FIG. 13, object positioning section 302 retrieves one piece of unprocessed peak position information from the peak position information acquired from detection processing section 301. Object positioning section 302 treats the retrieved peak position information as peak position information targeted for the process in S102 and S103 described below.

In S102, object positioning section 302 determines whether other peak position information exists that represents a distance separated by a distance corresponding to the difference in the delay amounts set in delay sections 102, from a distance (distance from intruding object detection system 10) represented in the peak position information for the process.

When the other peak position information does not exist (S102: No), the process progresses to a process of S104. On the other hand, when the other peak position information exists (S102: Yes), object positioning section 302 in S103 considers the other peak position information as peak position information corresponding to a reflected wave from the same object as an object corresponding to the peak position information for the process.

Consequently, when two pieces of peak position information exist that are separated by the distance corresponding to the difference in delay amounts set in respective delay sections 102 (S102: Yes), object positioning section 302 specifies the difference in delay amounts according to the distance difference between the peaks represented in the two pieces of peak position information. Thereby, object positioning section 302 estimates in which receiving region (the direction of the object) of receiving antenna 110 the object corresponding to the peak position information exists. Moreover, object positioning section 302 deducts the distance corresponding to the specified delay amount from the distance of the peak represented in the peak position information, and thereby estimates the actual distance from intruding object detection apparatus 300 to the object. Then, object positioning section 302 outputs object positioning information including the direction of the estimated object and the distance to the object, as an object positioning result.

In S104, object positioning section 302 determines whether unprocessed peak position information exists. When unprocessed peak position information exists (S104: Yes), the process returns to a process of S101 again. When unprocessed peak position information does not exist (S104: No), the process is completed.

Figure 15:
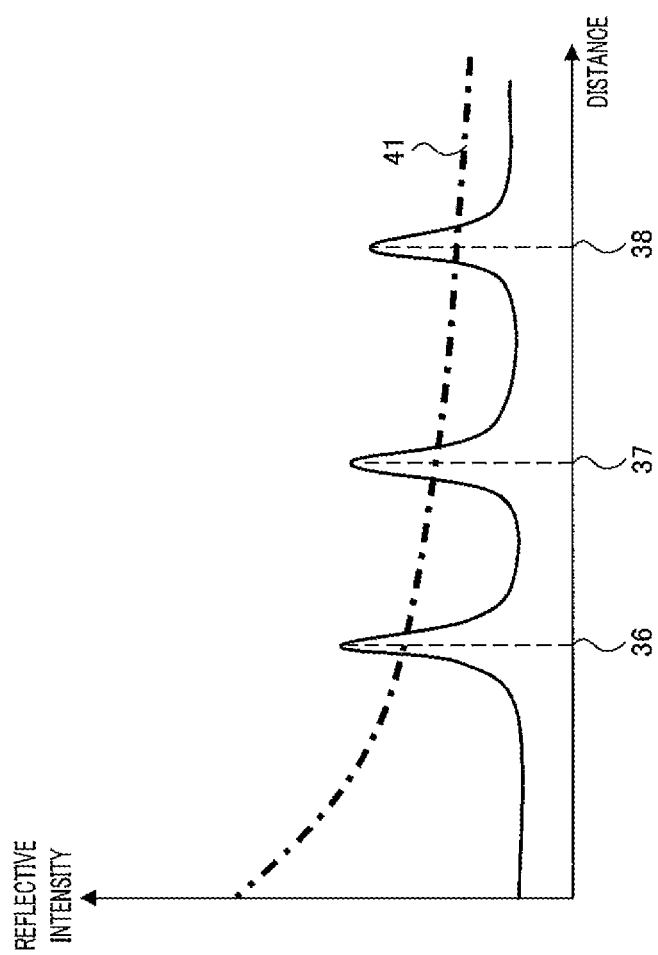
FIG. 15 explains the peak detection process according to Embodiment 2 of the present invention.
Figure 16:
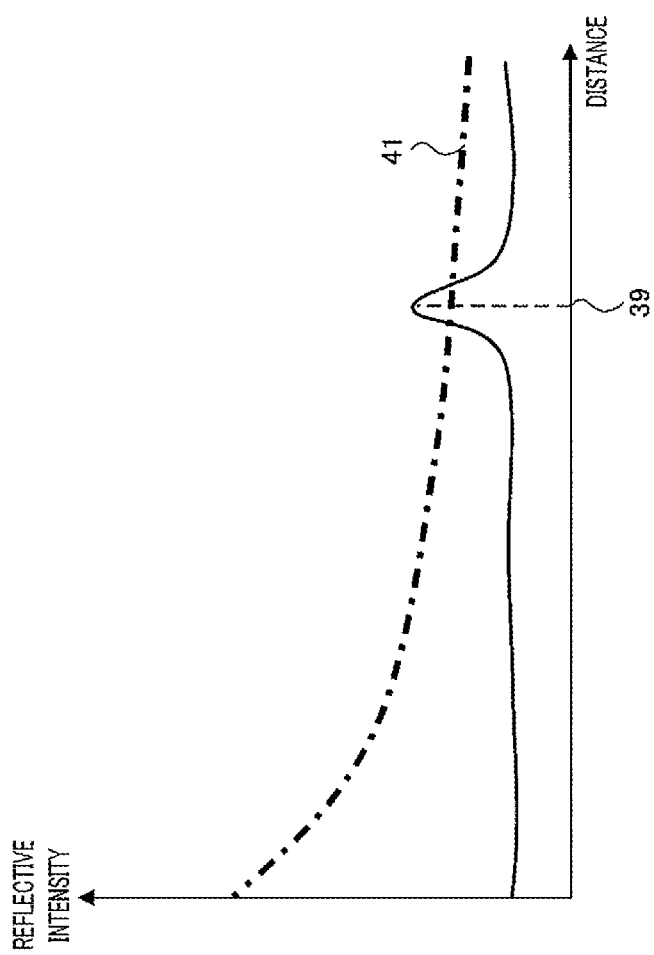
FIG. 16 explains the peak detection process according to Embodiment 2 of the present invention.

Next, an example case will be explained where an object intruding in the intruding object detection region exists in each position of object 90, object 91, and object 92 illustrated FIG. 12. In addition, threshold 41 illustrated in FIG. 14 to FIG. 16 is set to a value smaller than reflective intensity that can be taken by a reflected wave received in one receiving antenna 110.

Figure 14:
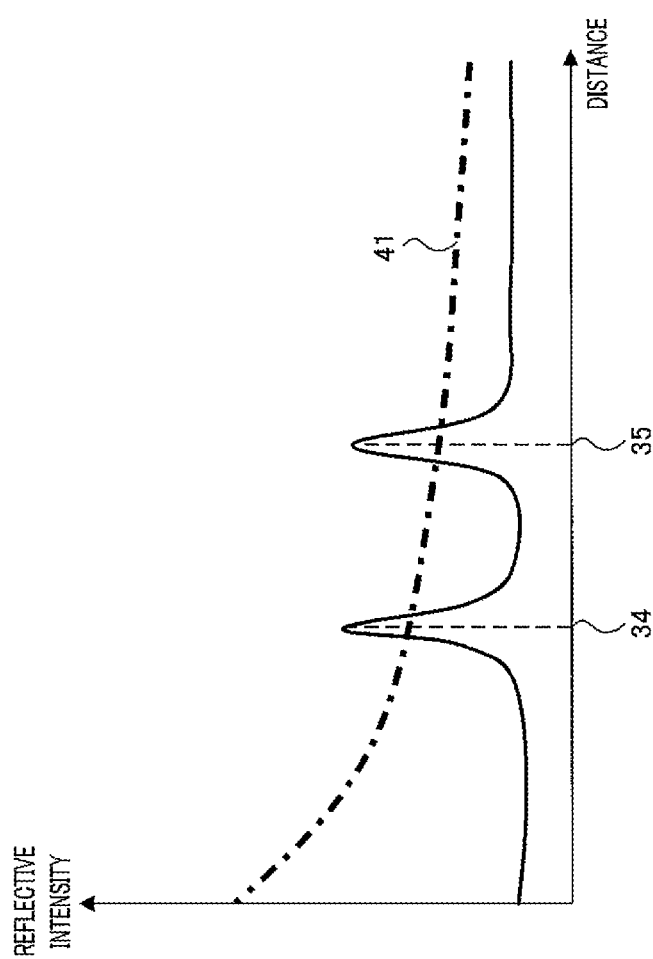
FIG. 14 explains a peak detection process according to Embodiment 2 of the present invention.

FIG. 14 illustrates an example of a radar profile when only object 90 exists in FIG. 12.

As described above, since different delay amounts are set in respective delay sections 102, two or more peaks appear in the radar profile illustrated in FIG. 14 even when only one object 90 exists in the intruding object detection region. Specifically, object 90 is located in a region where the receiving region of receiving antenna 110-1 overlaps with the receiving region of receiving antenna 110-2, as illustrated in FIG. 12. As a result, the reflected wave from object 90 is inputted into reflected wave input section 101-1 and 101-2 through receiving antennas 110-1 and 110-2, respectively. Moreover, the difference between distance 34 of one peak and distance 35 of the other peak illustrates FIG. 14 is equal to the distance corresponding to the difference between the delay amount set in delay section 102-1 and the delay amount set in delay section 102-2.

Therefore, since the distance difference between two peaks illustrated in FIG. 14 is equal to the distance corresponding to the difference in the delay amounts set in respective delay sections 102-1 and 102-2, detection processing section 301 judges that an intruding object exists in the intruding object detection region.

Moreover, since the distance difference in two peaks illustrated in FIG. 14 is equal to the distance corresponding to the difference in the delay amounts set in respective delay sections 102-1 and 102-2, object positioning section 302 estimates that an intruding object (object 90) exists in the direction of a region where the receiving region of receiving antenna 110-1 overlaps with the receiving region of receiving antenna 110-2. Furthermore, object positioning section 302 estimates the distance to an intruding object (object 90) using distance 34 or distance 35 illustrated in FIG. 14 and the delay amount set in delay section 102-1 or delay section 102-2. For example, object positioning section 302 makes this estimation by assuming that the distance to an intruding object is given as a distance obtained by deducting the distance corresponding to the smaller delay amount (larger delay amount) among the delay amounts set in delay sections 102-1 and delay section 102-2 from distance 34 (distance 35).

FIG. 15 illustrates an example of a radar profile when only object 91 exists in FIG. 12.

As illustrated in FIG. 12, object 91 is located in a region where the receiving regions of respective receiving antennas 110-1 to 110-3 overlap. As a result, the reflected waves from object 91 are received in reflected wave input sections 101-1 to 101-3 through receiving antennas 110-1 to 110-3, respectively. Moreover, the distance difference between respective peaks in the radar profile illustrated in FIG. 15 is equal to the distance corresponding to the difference in the delay amounts set in respective delay sections 102.

For example, it is assumed that the delay amount set in delay section 102-1 is the largest and that the delay amount set in delay section 102-3 is the smallest. In this case, among three peaks corresponding to reflected waves from the same object in the radar profile illustrated in FIG. 15, the distance of the peak corresponding to a reflected wave received through receiving antenna 110-1 is the longest (distance 38), and the distance of the peak corresponding to a reflected wave received through receiving antenna 110-3 is the shortest (distance 36). Moreover, in the profile illustrated in FIG. 15, the difference between distance 36 and distance 37 is equal to the distance corresponding to the difference in the delay amounts in delay sections 102-2 and 102-3, and the difference between distance 37 and distance 38 is equal to the distance corresponding to the difference in the delay amounts in delay sections 102-1 and 102-2.

Therefore, since the distance differences between three peaks illustrated in FIG. 15 are equal to the distances corresponding to the differences in the delay amounts set in respective delay sections 102-1 to 102-3, detection processing section 301 judges that an intruding object exists in the intruding object detection region.

Moreover, since the distance differences in three peaks illustrated in FIG. 15 are equal to the distances corresponding to the differences in the delay amounts set in respective delay sections 102, object positioning section 302 estimates that an intruding object (object 91) exists in the direction of a region where the receiving regions of receiving antennas 110-1 to 110-3 overlaps. Furthermore, object positioning section 302 estimates the distance to an intruding object (object 91) using distance 36, 37, or 38 and the delay amounts set in respective delay sections 102.

FIG. 16 illustrates an example of a radar profile when only object 92 exists in FIG. 12.

As illustrated in FIG. 12, object 92 is located in a region not overlapping with the receiving region of receiving antenna 110-2 in the receiving region of receiving antenna 110-3. As a result, the reflected wave from object 92 is received only in reflected wave input section 101-3 through receiving antenna 110-3. Therefore, only one peak appears in the radar profile illustrated in FIG. 16. Therefore, detection processing section 301 judges that any intruding object does not exist in the intruding object detection region. Moreover, since object 92 corresponding to one peak illustrated in FIG. 16 is located outside the intruding object detection region, object positioning section 302 judges object positioning information not to be generated.

Accordingly, in addition to detecting an object intruding in the intruding object detection region, intruding object detection apparatus 300 can specify the position of the object by estimating the direction and distance of the object.

Moreover, intruding object detection apparatus 300 receives a reflected wave from an object for intrusion detection in at least two receiving antennas 110 like Embodiment 1, and can thereby detect intrusion of the object into the intruding object detection region without switching of receiving antennas 110. Consequently, an intruding object can be detected without the need for switching of antennas. Moreover, in the present embodiment, since a processing section for switching antennas is unnecessary like Embodiment 1, an increase in cost of intruding object detection apparatus 100 can be avoid.

Moreover, in the present embodiment, even when multiple objects exist in the intruding object detection region simultaneously and multiple peaks exist in the radar profile, intruding object detection apparatus 300 may compare the distance differences between the peaks with the differences in the delay amounts set in respective delay sections 102 and may specify the combination of the matching peaks. That is, intruding object detection apparatus 300 specifies that the peaks of the specified combination represent a reflected wave from the same object. Accordingly, intruding object detection apparatus 300 distinguishes each of multiple objects in the intruding object detection region, and can thereby estimate the direction and distance of each object.

Moreover, the present embodiment has been explained in a case where intruding object detection apparatus 300 judges whether the peaks represent reflected waves from the same object on the basis of whether the distances of respective peaks are equal to the delay amounts. However, in order to judge whether multiple peaks appearing in the radar profile represent reflected waves from the same object, intruding object detection apparatus 300 may compare the degrees of similarity of reflective intensity of the respective peaks or the degrees of similarity of phases of the respective peaks and may thereby judge whether the peaks represent reflected waves from the same object.

Each embodiment of the present invention has been described thus far.

The embodiments of the present invention described above are provided as hardware. The present invention can be achieved through software in concert with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

An intruding object detection apparatus according to this disclosure is an apparatus that detects intrusion of an object into a region for detection, the apparatus including: an input section that receives signals reflected by a same object existing in the region for detection, using at least two respective antennas among a plurality of antennas; a delay section that delays the signals received respectively using the plurality of antennas using delay amounts that are different from each other, a combining section that combines the delayed signals; a frequency conversion section that frequency-converts the resultant combined signal into a baseband; a detection section that detects the frequency-converted signal; a generation section that generates a profile including distances from the antennas and signal intensity for each of the distances from the antennas using the detected signal; and a detection process section that detects a peak having the signal intensity exceeding a predetermined threshold in the profile and judges whether an intruding object exists in the region for detection based on the detected peak.

In addition, in the intruding object detection apparatus according to this disclosure: receiving regions of the at least two antennas do not overlap with each other, and an interval between respective intersection points of respective directivity directions of the at least two antennas and a boundary line of the region for detection is equal to or less than half of a width of a reflective surface of the object for detection; the delay amounts that are different from each other are set so as to equalize path lengths between the intersection points on the boundary line respectively corresponding to the at least two antennas and the combining section; the threshold is set to a larger value than signal intensity capable of being taken by a signal received in any one of the at least two antennas; and when detecting the peak having the signal intensity exceeding the threshold in the profile, the detection process section judges that an intruding object exists in the region for detection.

In the intruding object detection apparatus according to this disclosure, when detecting the peak having the signal intensity exceeding the threshold in the profile, and when a distance in the profile corresponding to the detected peak corresponds to a vicinity of the boundary line, the detection process section judges that an intruding object exists in the region for detection.

In the intruding object detection apparatus according to this disclosure: at least parts of receiving regions of the at least two antennas overlap with each other; the region for detection is set in a region where the receiving region of the at least two antennas overlap with each other, the threshold is set to a smaller value than signal intensity capable of being taken by a signal received in any one of the at least two antennas; and when at least two peaks having the signal intensity exceeding the threshold are detected in the profile, and when the distance difference between the at least two detected peaks is equal to a distance corresponding to a difference in delay amounts for signals received with the at least two antennas, the detection process section judges that an intruding object exists in the region for detection.

The intruding object detection apparatus according to this disclosure further includes a positioning section that, when the detection process section judges that an intruding object exists in the region for detection, estimates a direction of a region where the receiving regions of the at least two antennas overlap with each other, as a direction where the object exists, and estimates distances from the antennas to the object by assuming that the distances from the antennas to the object are as distances obtained by deducting distances corresponding to delay amounts for signals received with the at least two antennas from distances in the profile corresponding to the at least two peaks.

An intruding object detection method according to this disclosure is a method for detecting intrusion an object into a region for detection, the method including: receiving signals reflected by a same object existing in the region for detection, using at least two respective antennas among a plurality of antennas; delaying the signals received using the plurality of antennas using delay amounts that are different from each other; combining the respective delayed signals; frequency-converting the resultant combined signal into a baseband; detecting the frequency-converted signal; generating a profile including distances from the antennas and signal intensity for each of the distances from the antennas using the detected signal; and detecting a peak having the signal intensity exceeding a predetermined threshold in the profile, and judging whether an intruding object exists in the region for detection based on the detected peak.

The disclosure of Japanese Patent Application No. 2012-043043, filed on Feb. 29, 2012, including the specification, drawings and abstract, is incorporated herein by reference in its entirety.

INDUSTRIAL APPLICABILITY

An intruding object detection apparatus and an intruding object detection method according to the present invention is suitable for use in detecting an intruding object without switching of antennas.

REFERENCE SIGNS LIST

10 Intruding object detection system
100, 300 Intruding object detection apparatuses
110 Receiving antenna
200 Transmission signal generation section
210 Transmitting antenna
101 Reflected wave input section
102 Delay section
103 Signal combining section
104 Radar profile generation section
105, 301 Detection processing sections
106 Frequency conversion section
107 Detection section
302 Object positioning section

The invention claimed is:

1. An intruding object detection apparatus that detects intrusion of an object into a region for detection, the apparatus comprising:
   an input section that receives signals reflected by a same object existing in the region for detection, using at least two respective antennas among a plurality of antennas;
   a delay section that delays the signals received respectively using the plurality of antennas using delay amounts that are different from each other;
   a combining section that combines the delayed signals;
   a frequency conversion section that frequency-converts the resultant combined signal into a baseband;
   a detection section that detects the frequency-converted signal;
   a generation section that generates a profile including distances from the antennas and signal intensity for each of the distances from the antennas using the detected signal; and
   a detection process section that detects a peak having the signal intensity exceeding a predetermined threshold in the profile and judges whether an intruding object exists in the region for detection based on the detected peak.

2. The intruding object detection apparatus according to claim 1, wherein:
   receiving regions of the at least two antennas do not overlap with each other, and an interval between respective intersection points of respective directivity directions of the at least two antennas and a boundary line of the region for detection is equal to or less than half of a width of a reflective surface of the object for detection;
   the delay amounts that are different from each other are set so as to equalize path lengths between the intersection points on the boundary line respectively corresponding to the at least two antennas and the combining section;

the threshold is set to a larger value than signal intensity capable of being taken by a signal received in any one of the at least two antennas; and when detecting the peak having the signal intensity exceeding the threshold in the profile, the detection process section judges that an intruding object exists in the region for detection.

3. The intruding object detection apparatus according to claim 2, wherein when detecting the peak having the signal intensity exceeding the threshold in the profile, and when a distance in the profile corresponding to the detected peak corresponds to a vicinity of the boundary line, the detection process section judges that an intruding object exists in the region for detection.

4. The intruding object detection apparatus according to claim 1, wherein:

at least parts of receiving regions of the at least two antennas overlap with each other;

the region for detection is set in a region where the receiving region of the at least two antennas overlap with each other;

the threshold is set to a smaller value than signal intensity capable of being taken by a signal received in any one of the at least two antennas; and when at least two peaks having the signal intensity exceeding the threshold are detected in the profile, and when the distance difference between the at least two detected peaks is equal to a distance corresponding to a difference in delay amounts for signals received with the at least two antennas, the detection process section judges that an intruding object exists in the region for detection.

5. The intruding object detection apparatus according to claim 4, further comprising a positioning section that, when the detection process section judges that an intruding object exists in the region for detection, estimates a direction of a region where the receiving regions of the at least two antennas overlap with each other, as a direction where the object exists, and estimates distances from the antennas to the object by assuming that the distances from the antennas to the object are as distances obtained by deducting distances corresponding to delay amounts for signals received with the at least two antennas from distances in the profile corresponding to the at least two peaks.

6. An intruding object detection method for detecting intrusion an object into a region for detection, the method comprising:

receiving signals reflected by a same object existing in the region for detection, using at least two respective antennas among a plurality of antennas;

delaying the signals received using the plurality of antennas using delay amounts that are different from each other;

combining the respective delayed signals;

frequency-converting the resultant combined signal into a baseband;

detecting the frequency-converted signal;

generating a profile including distances from the antennas and signal intensity for each of the distances from the antennas using the detected signal; and detecting a peak having the signal intensity exceeding a predetermined threshold in the profile, and judging whether an intruding object exists in the region for detection based on the detected peak.

* * * * *